United States Patent
Kim et al.

(10) Patent No.: US 7,488,546 B2
(45) Date of Patent: Feb. 10, 2009

(54) MEDIUM- OR LARGE-SIZED BATTERY PACK HAVING SAFETY DEVICE

(75) Inventors: KiJae Kim, Daejeon (KR); Jongmoon Yoon, Daejeon (KR)

(73) Assignee: LG Chem, Ltd. (KR)

( * ) Notice: Subject to any disclaimer, the term of this patent is extended or adjusted under 35 U.S.C. 154(b) by 52 days.

(21) Appl. No.: 11/619,393

(22) Filed: Jan. 3, 2007

(65) Prior Publication Data

US 2007/0164711 A1 Jul. 19, 2007

(30) Foreign Application Priority Data

Jan. 4, 2006 (KR) ............... 10-2006-0000758

(51) Int. Cl.
H01M 14/00 (2006.01)
H01M 2/10 (2006.01)

(52) U.S. Cl. .............. 429/8; 320/150; 429/96; 429/98; 429/99; 429/62

(58) Field of Classification Search .............. 429/62, 429/122, 306, 324; 320/150
See application file for complete search history.

(56) References Cited

U.S. PATENT DOCUMENTS 5,051,325 A * 9/1991 Shishikura et al. .......... 429/341
2005/0250007 A1* 11/2005 Abe et al. .................. 429/200

FOREIGN PATENT DOCUMENTS

JP    WO 2005/096411 A2 * 10/2005

* cited by examiner

*Primary Examiner*—Dah-Wei Yuan
*Assistant Examiner*—Robert Hodge
(74) *Attorney, Agent, or Firm*—Cantor Colburn LLP

(57) ABSTRACT

Disclosed herein is a medium- or large-sized battery pack having a plurality of unit cells. The battery pack includes a safety device (fire-extinguishing safety device) for spraying a material to prevent or restrain the fire or the explosion of the battery pack when the temperature of the battery pack exceeds the critical temperature level threatening the safety of the battery pack. The fire-extinguishing safety device according to the present invention has the effect of securing the safety of the battery pack when the temperature or the voltage is abruptly increased entirely or partially in the battery pack due to various causes, such as a breakdown of a safety system, and it is not possible to control the battery pack only by an operation control system.

7 Claims, 2 Drawing Sheets

MEDIUM- OR LARGE-SIZED BATTERY PACK HAVING SAFETY DEVICE

FIELD OF THE INVENTION

The present invention relates to a medium- or large-sized battery pack having a fire-extinguishing safety device, and, more particularly, to a medium- or large-sized battery pack having a plurality of unit cells, wherein the battery pack includes a safety device for spraying a material to rapidly lower the temperature of the battery pack and/or a material to restrain the fire of the battery pack, when the temperature of the battery pack exceeds the critical temperature level threatening the safety of the battery pack, to such an extent that the battery pack may catch fire or explode, due to various causes, thereby securing the safety of the battery pack.

BACKGROUND OF THE INVENTION

In recent years, as concern about environmental pollution has increased, a secondary battery, which can be charged and discharged, has attracted considerable attention as a power source for vehicles in order to solve problems caused by existing gasoline and diesel vehicles using fossil fuel. As a result, electric vehicles (EV), which are operated only using a battery, and hybrid electric vehicles (HEV), which use jointly a battery and a conventional engine, have been developed. Some of the electric vehicles and the hybrid electric vehicles have been commercially used. A nickel-metal hydride (Ni-MH) secondary battery has been mainly used as the power source for the electric vehicles and the hybrid electric vehicles. In recent years, however, the use of a lithium secondary battery, which has high energy density and high discharge voltage, as the power source for the electric vehicles and the hybrid electric vehicles has been attempted. High output and large capacity are needed for such a secondary battery to be used as the power source for the electric vehicles and the hybrid electric vehicles. For this reason, a plurality of small-sized secondary batteries (unit cells) are connected in series with each other so as to construct a battery pack.

A large amount of heat is generated from the secondary batteries, i.e., the unit cells, during the charge and the discharge of the unit cells. When the heat generated from the unit cells during the charge and the discharge of the unit cells is not effectively removed, heat is accumulated in the unit cells with the result that the unit cells are degraded. Especially, the lithium secondary battery has a high possibility of danger in that the lithium secondary battery may catch fire or explode due to high temperature or overcharge of the lithium secondary battery. Consequently, it is very important to secure the safety of a medium- or large-sized battery pack including lithium secondary batteries as the unit cells.

However, currently developed safety systems have problems in that, when abrupt temperature increase, abrupt overcharge, or abrupt overcurrent occurs in a medium- or large-sized battery pack, the safety systems do not effectively control such abnormality. Also, this abrupt circumstantial change may put the safety system out of order. For example, a cooling system serves to circulate a coolant (for example, air) between the unit cells so as to decrease the temperature of the unit cells to a predetermined temperature level. When the temperature is abruptly increased entirely or partially in the battery pack, however, the cooling system does not provide a cooling efficiency sufficient to retrain the abrupt temperature increase. In addition, an operation control system serves to detect the temperature and the voltage of the unit cells and, when the detected value exceeds a predetermined level, interrupt electric current so as to suspend the operation of the battery pack. When the cause is not eliminated only by the suspension of the operation of the battery pack due to the abrupt circumstantial change, however, it is not possible to obtain the desired effect.

Consequently, there is high necessity of a technology for fundamentally solving problems caused when all or some of the unit cells are unstable due to various causes. Furthermore, since the medium- or large-sized battery pack is a battery pack including a plurality of secondary batteries, the fire or explosion of some of the secondary batteries results in the consecutive fire or explosion of the remaining secondary batteries, whereby a big accident may be caused.

In this connection, there has been proposed a safety device constructed in a structure in which a fire extinguishing agent or a coolant is disposed in a battery pack system while the fire extinguishing agent or the coolant is stored in a predetermined container, and, when a detected value exceeds a predetermined temperature level as a result of the detection of the temperature of the battery pack, the fire extinguishing agent or a coolant is injected using an injection unit. However, this safety device needs several components, such as the container for storing the fire extinguishing agent or the coolant, the injection unit, the temperature detection unit, etc. As a result, the manufacturing costs of the safety device are high, and the safety device needs a large installation space in the battery pack system. Consequently, the use of the safety device is not suitable for the manufacture of a more effective battery pack.

SUMMARY OF THE INVENTION

Therefore, the present invention has been made to solve the above problems, and other technical problems that have yet to be resolved.

As a result of a variety of extensive and intensive studies and experiments to solve the problems as described above, the inventors of the present invention have developed a technology for fundamentally securing the safety of a battery pack when the temperature of the battery pack is abruptly increased, which is not solved by a conventional safety system, such as an operation control system, and effectively performing the operation with a reduced number of components and a small installation space. The present invention has been completed based on this technology.

In accordance with the present invention, the above and other objects can be accomplished by the provision of a medium- or large-sized battery pack having a plurality of unit cells, wherein the battery pack is constructed in a structure in which perfluoroketone, as a fire extinguishing agent, is disposed in the battery pack while the perfluoroketone is stored in a predetermined container in a sealed state, and the sealed container is broken due to the increase of vapor pressure caused by the evaporation of the perfluoroketone, when the temperature of the battery pack is increased, whereby the evaporated perfluoroketone is ejected.

According to the present invention, the medium- or large-sized battery pack includes a safety device (hereinafter, also referred to as a "fire-extinguishing safety device") for spraying a fire extinguishing agent to prevent or restrain the fire or the explosion of the battery pack when it is not possible to control the battery pack only by an operation control system. Furthermore, the fire-extinguishing safety device timely sprays the fire extinguishing agent without the use of an additional temperature detection unit or a spraying unit. Consequently, the number of components and the size of installation space are considerably reduced.

The fire or the explosion of the battery pack mainly results from the abrupt increase of the temperature of the battery pack. Consequently, the fire-extinguishing safety device is constructed such that the fire-extinguishing safety device is operated when the temperature of the battery pack exceeds the lower temperature limit of a specific critical temperature range. The critical temperature may be decided depending upon various factors, such as kinds of unit cells, the number of the unit cells, and the operating condition of the battery pack. Generally, the proper operating temperature of the battery pack is −30 to 60° C., and there is a high possibility that the battery pack may catch fire at a temperature of 150° C. or more. However, there is a possibility that the battery pack may catch fire due to short circuits even at a relatively low temperature. Consequently, an appropriate temperature range may be set as the critical temperature in consideration of the above-mentioned conditions.

The fire extinguishing agent is not particularly restricted so long as the fire extinguishing agent is a material to rapidly lower the temperature of the battery pack and restrain the fire of the battery pack. For example, the fire extinguishing agent may be any solid-phase, liquid-phase, or gas-phase material. Preferably, the fire extinguishing agent is a material which is maintained at least in a gas phase near the critical temperature such that the fire extinguishing agent can be rapidly sprayed to the region of the battery pack where the safety-related problem is caused. A large number of such materials are well known in the art to which the present invention pertains, and these materials must be interpreted to be within the scope of the present invention.

A desirable example of such a fire extinguishing agent may be perfluoroketone, which is maintained in a liquid phase within the normal operating temperature range of the battery pack and is changed into a gas phase near the critical temperature. The perfluoroketone with the above-stated physical properties is maintained at least in the liquid phase at the temperature lower than the critical temperature. Consequently, the perfluoroketone may be disposed in the battery pack while the perfluoroketone is contained in a small-sized container constructed as described above. Furthermore, the perfluoroketone is evaporated near the critical temperature. As a result, the volume of the perfluoroketone is increased, and therefore, the container is broken by the perfluoroketone. Consequently, the perfluoroketone is ejected to perform a fire-extinguishing operation without the use of an additional temperature detection unit or a spraying unit.

A particularly desirable example of the perfluoroketone may be a compound represented by the following formula: $CF_3CF_2C(O)CF(CF_3)_2$. The perfluoroketone represented by the above formula has a boiling point of approximately 50° C. under the atmospheric pressure (1 atm). Consequently, the perfluoroketone is maintained in a liquid phase within the normal operating temperature range of the battery pack. When the temperature of the battery pack is increased, on the other hand, the perfluoroketone is evaporated, and therefore, the vapor pressure of the perfluoroketone is gradually increased. However, the perfluoroketone is stored in the container of the fire-extinguishing device according to the present invention in a sealed state. As a result, the perfluoroketone is not ejected although the vapor pressure of the perfluoroketone is increased. When the temperature of the battery pack is continuously increased, and therefore, the temperature of the battery pack reaches the critical temperature, the vapor pressure of the perfluoroketone is abruptly increased, and therefore, the container is broken and the perfluoroketone is ejected out of the container.

When the perfluoroketone is used as the fire extinguishing agent, the following advantages are obtained. A first advantage is an operation-related advantage. Specifically, the perfluoroketone is maintained in a liquid phase at a temperature lower than the normal operating temperature of the battery cell, i.e., at a temperature of 50° C. or less, and is automatically evaporated at a temperature higher than the normal operating temperature of the battery cell. Consequently, the perfluoroketone has high operating reliability, and an additional temperature detection unit and a control unit are not needed. Furthermore, the perfluoroketone is maintained in a liquid phase at a temperature lower than the normal operating temperature of the battery cell, and therefore, an expensive compression container is not needed. A second advantage is an installation-related advantage. Specifically, the perfluoroketone is automatically evaporated at a specific temperature, the container is broken by the vapor pressure of the perfluoroketone, and the perfluoroketone is introduced to the battery cells. Consequently, an additional temperature detection unit or a spraying unit is not needed. Third, although the container is broken at an unexpected situation, and, as a result, the perfluoroketone is ejected, the perfluoroketone does not affect the components of the battery pack. For example, the components of the battery pack are not oxidized by the perfluoroketone.

The sealed container is not particularly restricted so long as the sealed container is constructed in a structure to perform the above-described operations. In a preferred embodiment, the sealed container includes a hollow housing opened at one end thereof and having the perfluoroketone stored therein, and a cover member mounted to the open end of the housing for sealing the perfluoroketone, the cover member being broken at a predetermined inner pressure. More preferably, the cover member is provided at least one major surface thereof with a notch for allowing the cover member to be easily broken when the inner pressure is increased. Consequently, when the volume of the fire extinguishing agent is increased due to the increase of the temperature of the battery pack, the sealed container is easily opened, and therefore, it is possible to increase the accuracy of the operation of the fire extinguishing device depending upon the increase of the temperature of the battery pack.

Preferably, the housing includes a closed lower end mounted to the battery pack and a cylindrical side part vertically extending from the closed lower end. More preferably, the cover member is mounted to an inner upper end of the cylindrical side part, and a gasket is disposed at the region where the cover member is mounted to the inner upper end of the cylindrical side part. The sealability of the housing is improved through the use of the gasket, and therefore, it is possible to prevent the fire extinguishing agent from leaking at the normal operating temperature of the battery pack.

According to circumstances, fire extinguishing agent may be stored in a hollow part of the housing while the fire extinguishing agent is sealed by a film-shaped sheet. The sheet prevents the leakage of the fire extinguishing agent due to any gap existing in the sealing member or the aging of the sealing member. That is, the sheet improves the sealability and storability of the fire extinguishing agent.

The fire-extinguishing safety device according to the present invention may be disposed in the battery pack in various manners. For example, a double-sided adhesive tape is attached to the lower end of the housing of the fire-extinguishing safety device such that the fire-extinguishing safety device can be attached to a predetermined position of the battery pack by the double-sided adhesive tape. Alternatively, coupling holes are formed in the lower end of the housing, and bolts are inserted through the respective coupling holes such that the fire-extinguishing safety device can be coupled to a predetermined position of the battery pack using the bolts.

The unit cells constituting the medium- or large-sized battery pack according to the present invention are not particularly restricted so long as the unit cells are secondary batteries. For example, nickel-cadmium batteries, nickel-metal hydride batteries, lithium-ion batteries, and lithium polymer batteries may be used as the unit cells. Among them, the lithium ion batteries and the lithium polymer batteries, which have high energy density and high discharge voltage, are preferably used as the unit cells.

Also, the battery pack is preferably constructed in a compact structure because the battery pack is used as a power source for vehicles, such as electric vehicles (EV) and hybrid electric vehicles (HEV). Generally, the battery pack needs an empty space for cooling a unit cell, a group of unit cells, or groups of unit cells so as to uniformly maintain the operating temperature of the battery pack. The fire-extinguishing safety device is mounted in the empty space of the battery pack, and therefore, there is not needed an additional space for mounting the fire-extinguishing safety device. Consequently, it is possible to minimize the total size of the battery pack.

In a preferred embodiment, two or more fire-extinguishing safety devices are mounted in the battery pack. In this case, no large-sized fire-extinguishing safety devices are needed, and therefore, the space necessary for mounting the fire-extinguishing safety device is reduced. Also, a plurality of fire-extinguishing safety devices may be mounted at required parts of the battery pack. Consequently, it is possible to quickly respond to the local increase of the temperature of the battery pack, and therefore, the safety of the battery pack is improved.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
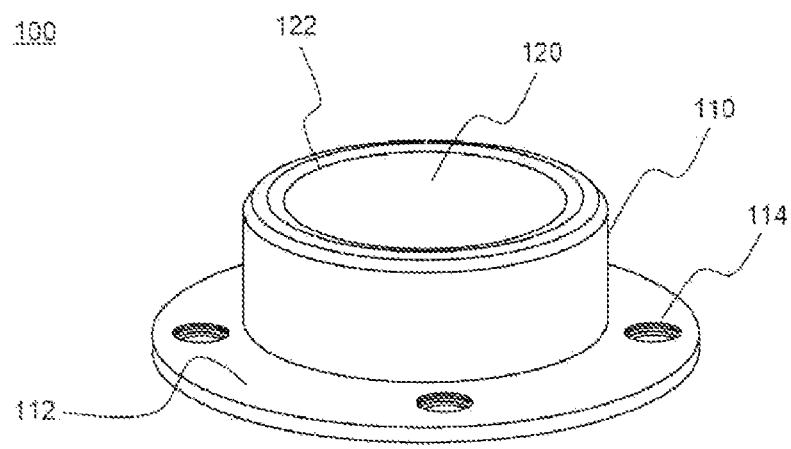
FIG. 1 is a perspective view illustrating a fire-extinguishing safety device according to a preferred embodiment of the present invention.

FIG. 1 is a perspective view illustrating a fire-extinguishing safety device 100 according to a preferred embodiment of the present invention.

Referring to FIG. 1, the fire-extinguishing safety device 100 includes a hollow housing 110 and a cover member 120. The housing 110 is open at the upper end thereof. A fire extinguishing agent is stored in a hollow part of the housing 110, and the housing 110 is sealed by the cover member 120. The cover member 120 is provided at one major surface thereof with a notch 122 for allowing the cover member 120 to be easily broken when the inner pressure is increased.

At the lower end of the housing 110 is formed a side extension 112 having a plurality of coupling holes 114. Consequently, the fire-extinguishing safety device 100 is easily mounted to a predetermined region of a battery pack (not shown) in a coupling fashion.

Figure 2:
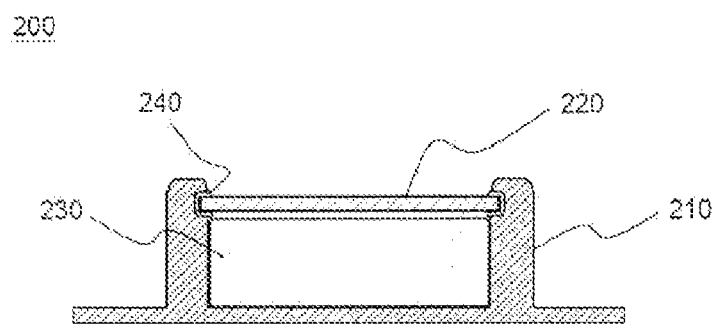
FIGS. 2 and 3 are sectional views respectively illustrating fire-extinguishing safety devices according to other preferred embodiments of the present invention.
Figure 3:
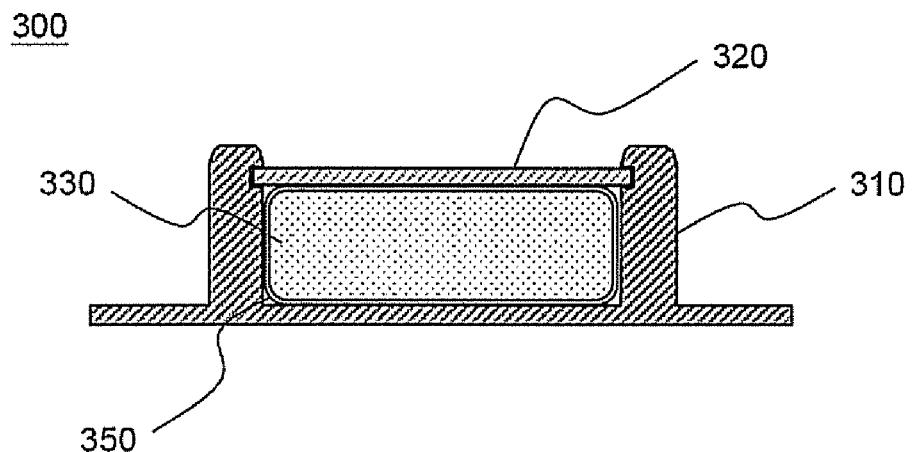

FIGS. 2 and 3 are sectional views respectively illustrating fire-extinguishing safety devices 200 and 300 according to other preferred embodiments of the present invention.

Referring first to FIG. 2, the fire-extinguishing safety device 200 is constructed in a structure in which a fire extinguishing agent 230 is stored in a hollow part of a housing 210, and a cover member 220 is mounted to an open upper end of the housing 210 via a gasket 240.

The fire extinguishing agent 230 is maintained in a liquid phase within a normal operating temperature range of a battery pack (not shown). When the temperature of the battery pack exceeds the boiling point of the fire extinguishing agent 230, the vapor pressure of the fire extinguishing agent 230 is abruptly increased. However, the fire extinguishing agent 230 is not sprayed due to the cover member 220. When the temperature of the battery pack reaches the critical temperature level, the vapor pressure of the fire extinguishing agent 230 is further increased. As a result, the cover member 220 is broken, and therefore, the fire extinguishing agent 230 is sprayed out of the housing 210.

Referring now to FIG. 3, the fire-extinguishing safety device 300 is different from the fire-extinguishing safety device 200 shown in FIG. 2 in that a fire extinguishing agent 330 is stored in a housing 310 while the fire extinguishing agent 330 is sealed by a film-shaped sheet 350, and the fire extinguishing agent 330 sealed by the film-shaped sheet 350 is covered by a cover member 320. Consequently, the fire extinguishing agent 330 the vapor pressure of which is increased due to the temperature increase of the battery pack is sprayed out of the housing 310 only when both the sheet 350 and the cover member 320 are broken.

Figure 4:
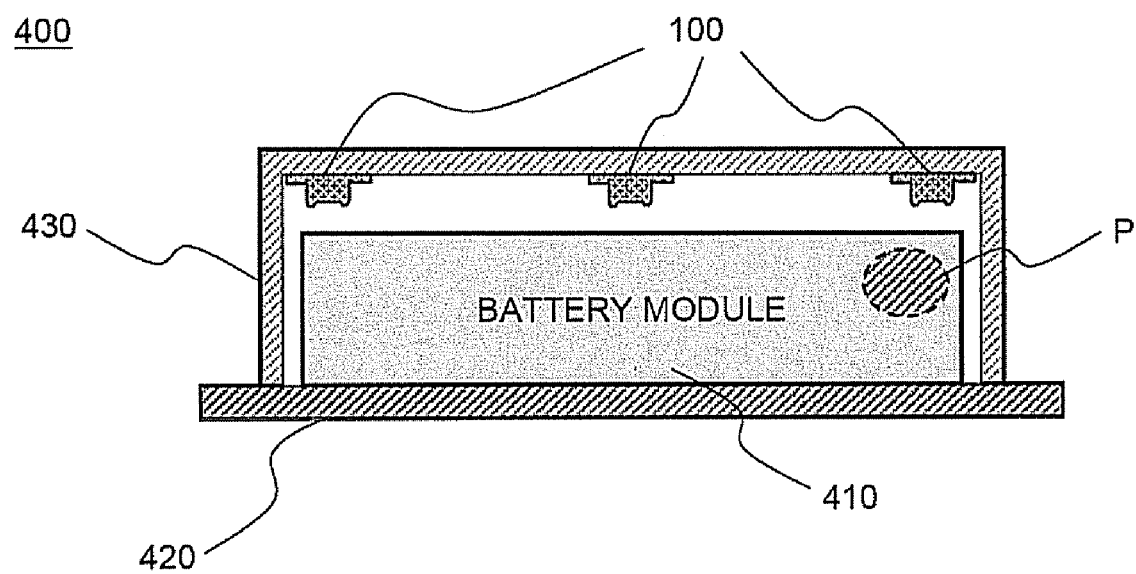
FIG. 4 is a view illustrating a medium- or large-sized battery pack having fire-extinguishing safety devices, one of which is shown in FIG. 1, mounted therein.

FIG. 4 is a view illustrating a medium- or large-sized battery pack 400 having fire-extinguishing safety devices, one of which is shown in FIG. 1, mounted therein.

Referring to FIG. 4, the medium- or large-sized battery pack 400 includes a battery module 410 having a plurality of unit cells electrically connected with each other, a lower plate 420 on which the battery module 410 is located, and an outer case 430 for covering the battery module 410. In the battery pack 400 is provided an empty space for mounting a cooling flow channel and other members. In this empty space is mounted a plurality of fire-extinguishing safety devices as shown in FIG. 1. Of course, a plurality of fire-extinguishing safety devices as shown in FIG. 2 or a plurality of fire-extinguishing safety devices as shown in FIG. 3 may be mounted in the empty space. When the battery module 410 is abruptly overheated or catches fire at a specific region P, and therefore, the temperature of the battery module 410 is increased to the critical temperature level, the fire extinguishing agent is sprayed from the housing, and is then dispersed into the battery module 410. As a result, a fire extinguishing operation is performed at the specific region P of the battery module 410.

The fire-extinguishing safety device may be constructed in various structures so long as the principal of the present invention is realized by the fire-extinguishing safety device. Consequently, it should be understood that various modifications are possible by those skilled in the art, and such modifications are included in the scope of the present invention.

INDUSTRIAL APPLICABILITY

As apparent from the above description, the present invention has the effect of spraying the fire extinguishing agent, when the temperature is abruptly increased entirely or partially in the medium- or large-sized battery pack due to various causes, such as a breakdown of the safety system, and it is not possible to control the battery pack only by the operation control system, thereby preventing or restraining the batteries from catching fire or exploding, and therefore, securing the safety of the battery pack.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A medium- or large-sized battery pack having a plurality of unit cells, the battery pack comprising safety device disposed within the battery pack outside the unit cells, the safety device including:
    a sealed container containing perfluoroketone; as a fire extinguishing agent, the sealed container capable of being broken due to an increase of vapor pressure caused by evaporation of the perfluoroketone to eject the evaporated perfluoroketone, when the temperature of the battery pack is increased,
    wherein the sealed container comprises a hollow housing opened at one end thereof, and a cover member mounted to the open end of the housing, the cover member capable of being broken or detached by the increase of vapor pressure to eject the evaporated perfluoroketone.

2. The battery pack according to claim 1, wherein the perfluoroketone is a compound represented by the following formula: $CF_3CF_2C(O)CF(CF_3)_2$.

3. The battery pack according to claim 1, wherein the housing includes a closed lower end and a cylindrical side part vertically extending form the closed lower end, the safety device being mounted to the battery pack using the closed lower end.

4. The battery pack according to claim 3, wherein the cover member is mounted to an inner upper end of the cylindrical side part, and a gasket is disposed at the region where the cover member is mounted to the inner upper end of the cylindrical side part.

5. The battery pack according to claim 1, wherein the cover member is provided at at least one major surface thereof with a notch for allowing the cover member to be easily broken by the increase of vapor pressure.

6. The battery pack according to claim 1, wherein the perfluoroketone is sealed by a film-shaped sheet and the sealed perfluoroketone is disposed inside of the hollow housing.

7. The battery pack according to claim 1, wherein two or more safety devices are mounted in the battery pack.

* * * * *